(12) United States Patent
White, III et al.

(10) Patent No.: US 12,138,720 B2
(45) Date of Patent: Nov. 12, 2024

(54) ARTICLE AND METHOD OF MAKING AN ARTICLE BY CHEMICAL VAPOR INFILTRATION

(71) Applicant: RAYTHEON TECHNOLOGIES CORPORATION, Farmington, CT (US)

(72) Inventors: Robert A. White, III, Meriden, CT (US); David A. Litton, West Hartford, CT (US); Timothy J. Harding, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/080,468

(22) Filed: Dec. 13, 2022

(65) Prior Publication Data

US 2024/0189951 A1 Jun. 13, 2024

(51) Int. Cl.
| | |
|---|---|
| *B23P 6/00* | (2006.01) |
| *C04B 35/80* | (2006.01) |
| *C04B 41/45* | (2006.01) |
| *C04B 41/50* | (2006.01) |
| *C04B 41/87* | (2006.01) |
| *F02C 7/00* | (2006.01) |

(52) U.S. Cl.
CPC ............... *B23P 6/00* (2013.01); *C04B 35/80* (2013.01); *C04B 41/4531* (2013.01); *C04B 41/5032* (2013.01); *C04B 41/5042* (2013.01); *C04B 41/87* (2013.01); *C04B 2235/612* (2013.01); *F02C 7/00* (2013.01); *F05D 2230/80* (2013.01); *F05D 2300/6033* (2013.01)

(58) Field of Classification Search
CPC ....... B23P 6/00; C04B 35/80; C04B 41/4531; C04B 41/5032; C04B 41/5042; C04B 41/87; C04B 2235/612; F02C 7/00; F05D 2230/80; F05D 2300/6033
See application file for complete search history.

(56) References Cited

U.S. PATENT DOCUMENTS

| | | | |
|---|---|---|---|
| 4,121,990 A | 10/1978 | Boulton | |
| 5,439,348 A | 8/1995 | Hughes et al. | |

(Continued)

FOREIGN PATENT DOCUMENTS

FR 2850649 A1 8/2004

OTHER PUBLICATIONS

Zhang, J., Liu, Y., Cheng, L., Zhao, H., Wang, J., Zhang, Y., Zongbei, H., Zhang, B., and Zhang, L. (2019). Effect of a diffusion-enhancing hole on the densification of a thick-section 2D C/SiC composite. Journal of the European Ceramic Society. vol. 39, No. 15. Jul. 26, 2019. pp. 4609-4616.

(Continued)

*Primary Examiner* — Lee A Holly

(74) *Attorney, Agent, or Firm* — Carlson, Gaskey & Olds, P.C.

(57) ABSTRACT

A method of repairing a nonconforming article includes applying a machinable coating to an article with a nonconformance. The article includes a preform at least partially infiltrated with a matrix material, to form a repaired article. The method also includes machining the machinable coating and completing infiltration of the repaired article with the matrix material. A method of repairing an article is also disclosed.

16 Claims, 2 Drawing Sheets

(56) References Cited

U.S. PATENT DOCUMENTS

| | | | |
|---|---|---|---|
| 6,418,618 | B1 | 7/2002 | Burdgick |
| 10,024,175 | B2 | 7/2018 | Varney |
| 10,100,656 | B2 | 10/2018 | Bancheri et al. |
| 10,113,435 | B2 | 10/2018 | Pater |
| 10,401,028 | B2 | 9/2019 | Freeman et al. |
| 10,458,653 | B2 | 10/2019 | Freeman et al. |
| 10,465,534 | B2 | 11/2019 | Freeman et al. |
| 10,472,976 | B2 | 11/2019 | Freeman et al. |
| 10,934,873 | B2 | 3/2021 | Sarawate et al. |
| 11,143,040 | B2 | 10/2021 | McCaffrey et al. |
| 11,466,585 | B2 | 10/2022 | Arbona et al. |
| 2004/0113520 | A1 | 6/2004 | Thierry et al. |
| 2006/0147622 | A1* | 7/2006 | Gray .................... C04B 41/009 427/430.1 |
| 2008/0089781 | A1 | 4/2008 | Johnson et al. |
| 2013/0004320 | A1 | 1/2013 | Edmundo et al. |
| 2016/0298467 | A1 | 10/2016 | Ucasz |
| 2017/0030211 | A1 | 2/2017 | Marin et al. |
| 2017/0058686 | A1 | 3/2017 | Bancheri |
| 2018/0030593 | A1* | 2/2018 | Policandriotes ...... C23C 16/045 |
| 2018/0311934 | A1* | 11/2018 | Shoemaker ............... B32B 3/30 |
| 2019/0022784 | A1* | 1/2019 | Lin ........................ B23K 9/042 |
| 2019/0151972 | A1 | 5/2019 | Maradia et al. |
| 2019/0366656 | A1* | 12/2019 | Roberts .................. B29C 73/02 |
| 2020/0141276 | A1 | 5/2020 | Wolfe et al. |
| 2020/0165713 | A1 | 5/2020 | Venkataramani et al. |
| 2022/0105658 | A1 | 4/2022 | Antesberger et al. |
| 2022/0169574 | A1 | 6/2022 | Shim et al. |
| 2023/0191528 | A1* | 6/2023 | Nasserrafi ............... C23C 18/32 228/235.1 |

OTHER PUBLICATIONS

European Search Report for EP Application No. 23216448.3 dated May 17, 2024.

* cited by examiner

ARTICLE AND METHOD OF MAKING AN ARTICLE BY CHEMICAL VAPOR INFILTRATION

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Various components of the gas turbine engine may be made of ceramic matrix composites. One method of making ceramic matrix composite articles is chemical vapor infiltration. However, when it is discovered during or after the chemical vapor infiltration process that an article includes a defect or nonconformance during the chemical vapor infiltration process, it is difficult to repair the article because most machining and repair processes are unsuitable for ceramic matrix composite components.

SUMMARY OF THE INVENTION

A method of repairing a nonconforming article according to an exemplary embodiment of this disclosure, among other possible things includes applying a machinable coating to an article with a nonconformance. The article includes a preform at least partially infiltrated with a matrix material. The method also includes machining the machinable coating and completing infiltration of the repaired article with the matrix material.

In a further example of the foregoing, the machining includes at least one of grinding, ultrasonic machining, water guided laser, milling, and reaming.

In a further example of any of the foregoing, the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

In a further example of any of the foregoing, the coating includes at least one of hafnon, zircon, and mullite.

In a further example of any of the foregoing, the nonconformance includes at least one of a dent, a depression, or a hole.

In a further example of any of the foregoing, the machinable coating fills in the nonconformance after the applying.

In a further example of any of the foregoing, the nonconformance is that the article is smaller in a respect than a desired geometry of the article.

In a further example of any of the foregoing, the applying includes applying the machinable coating to a geometry that is larger than the desired geometry in the respect.

In a further example of any of the foregoing, the machining includes machining the machinable coating to the desired geometry.

In a further example of any of the foregoing, the infiltration is by chemical vapor infiltration.

In a further example of any of the foregoing, the preform includes ceramic-based reinforcements and the matrix is a ceramic-based matrix.

A method of repairing an article according to an exemplary embodiment of this disclosure, among other possible things includes placing a preform including ceramic-based reinforcements into a reactor, flowing reactive gases through the reactor to infiltrate ceramic-based matrix material into the preform, and removing an at least partially-infiltrated article from the reactor. The at least partially-infiltrated article has a nonconformance. The method also includes repairing the nonconformance, replacing the at least partially-infiltrated article in the reactor, and flowing reactive gases through the reactor to complete infiltration of the ceramic-based matrix material into the at least partially-infiltrated article.

In a further example of the foregoing, the repairing is by applying a machinable coating.

In a further example of any of the foregoing, the nonconformance includes at least one of a dent, a depression, or a hole.

In a further example of any of the foregoing, the machinable coating fills in the nonconformance after the applying.

In a further example of any of the foregoing, the nonconformance is that the article is smaller in a respect than a desired geometry of the article.

In a further example of any of the foregoing, the applying includes applying the machinable coating to a geometry that is larger than the desired geometry in the respect.

In a further example of any of the foregoing, the method also includes machining the machinable coating to the desired geometry.

In a further example of any of the foregoing, the partially-infiltrated article is at least 50% infiltrated with the ceramic-based matrix material at the removing step.

In a further example of any of the foregoing, the partially-infiltrated article is at least 75% infiltrated with the ceramic-based matrix material at the removing step.

DETAILED DESCRIPTION

Figure 1:
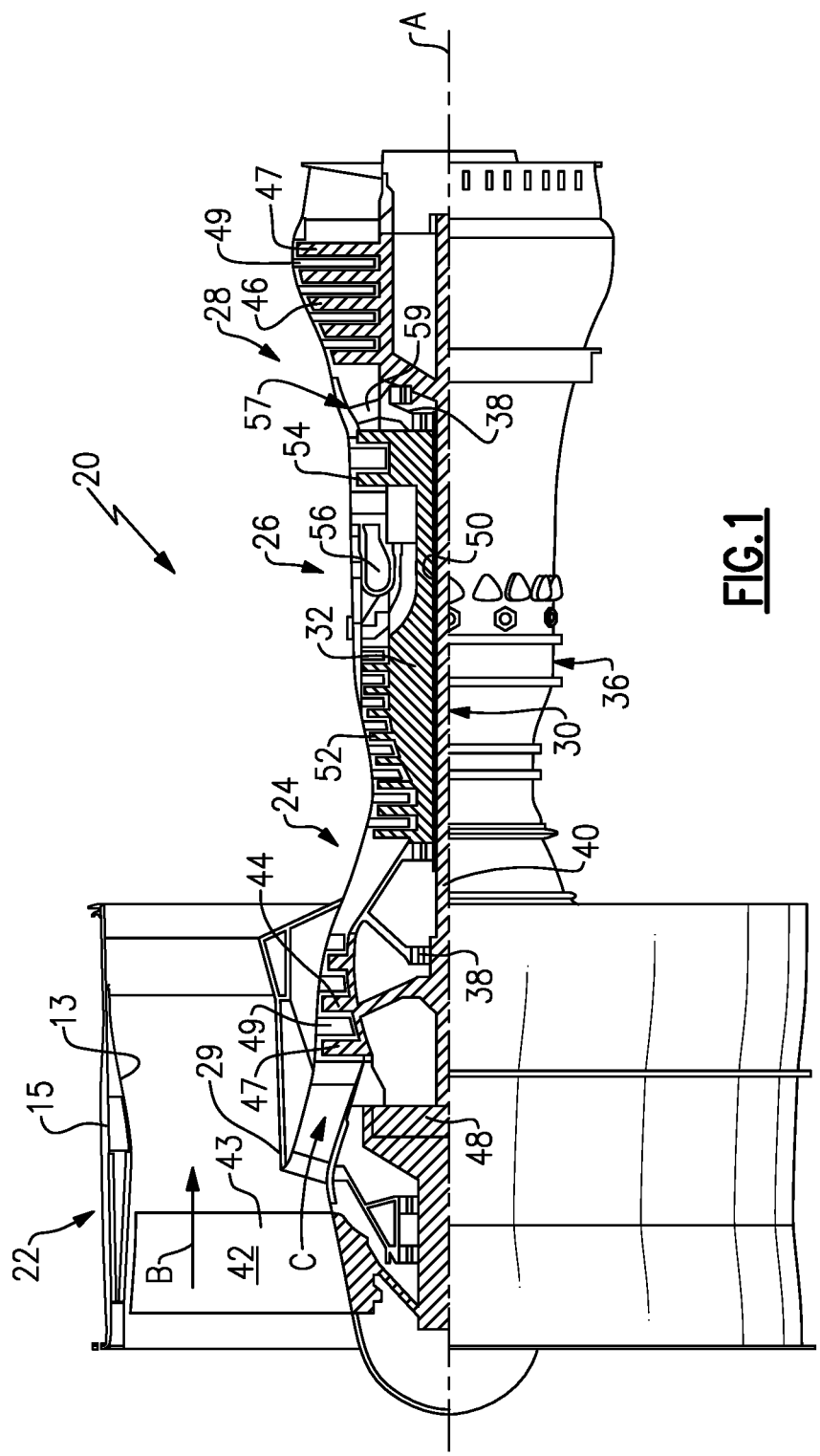
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(T_{ram} °R)/(518.7°R)]^{0.5}$. The corrected fan tip speed can be less than or equal to 1150.0 ft/second (350.5 meters/second), and can be greater than or equal to 1000.0 ft/second (304.8 meters/second).

Ceramic matrix composites ("CMCs") are known in the art and will not be described in detail herein, but generally include ceramic-based reinforcements such as fibers (which may be continuous) disposed in a ceramic-based matrix material. CMCs can be used in various areas of the engine 20, for instance, as airfoils. Chemical vapor infiltration (CVI) is a process that can be used to make CMC articles. CVI is known in the art and will not be described in detail herein, but generally includes placing a preform into a reactor, and flowing reactive gases through the reactor at high temperature to infiltrate matrix material into the preform. Occasionally during the CVI process it may be determined that an article being formed is nonconforming in that it has a scuff or dent, or is too small in certain respects. This application will describe a method of repairing nonconforming articles during the CVI process.

Figure 2:
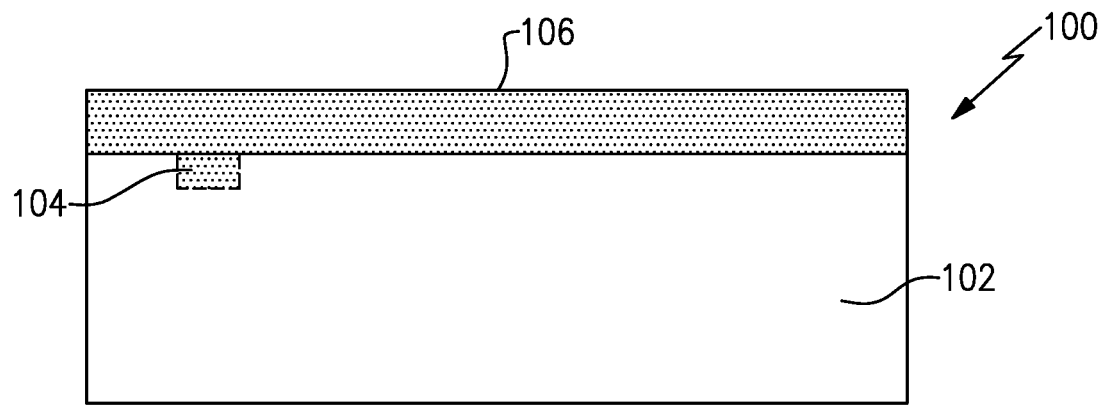
FIG. 2 schematically illustrates an article with a defect that has been repaired.

FIG. 2 schematically illustrates a repaired article 100. The repaired article 100 includes a nonconforming article 102 with a nonconformance 104 which in this case is a dent/depression, hole, or the like. In order to repair the nonconforming article 102 during the CVI process, the nonconforming article is removed from the reactor in which CVI is being performed when the preform is only partially infiltrated with matrix material. In one particular example, the nonconforming article 102 is removed from the reactor towards the end of the CVI process, when at least about 50% of the desired matrix has been infiltrated into the preform. In a more particular example, at least about 75% of the desired matrix has been infiltrated into the preform when the nonconforming article 102 is removed from the CVI reactor.

A machinable coating 106 is applied to a surface of the nonconforming article 102, filling in the nonconformance 104. The coating 106 is "machinable" in that it can be subject to grinding, ultrasonic machining, water guided laser, milling, reaming, or another machining method to reduce it thickness and/or smooth its surface without any negative effects to its integrity or the integrity of the CMC nonconforming article 102.

The machinable coating 106 may include rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the machinable coating 106 includes at least one of hafnon, zircon, and mullite.

The machinable coating 106 is then machined by grinding, ultrasonic machining, water guided laser, milling, reaming, or another machining method to reduce it thickness and/or smooth its surface, and to provide a desired surface profile for the repaired article.

The repaired article 100 may then be returned to the reactor and CVI is completed until the desired matrix infiltration is complete. In this case, the machinable coating 106 is selected to withstanding the temperatures at which CVI occurs, which may be greater than about 1000 degrees C., without degrading or otherwise compromising its integrity. In an alternative approach, the machinable coating 106 is applied and machined after the CMC is completely infiltrated. In this case, the machinable coating would not need to be able to withstand the CVI process environment, and so material selection of the coating 106 would not need to be based on this criterion which may expand the possibilities. Still, any of the example materials discussed above could be used.

Figure 3:
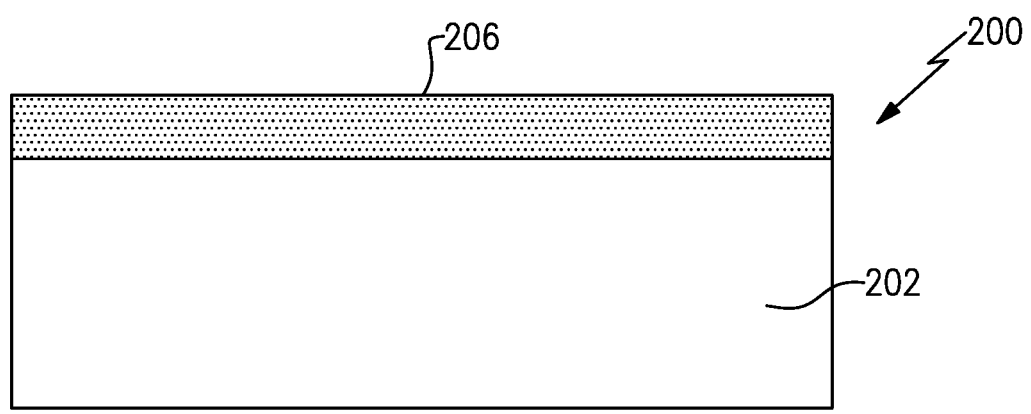
FIG. 3 schematically illustrates an article that has been repaired to address a size nonconformance.

FIG. 3 schematically illustrates another example repaired article 200. The repaired article 200 includes a nonconforming article 202 with a nonconformance which in this case is that the nonconforming article 202 is too small in some respect. The nonconforming article 202 is repaired in the same way as the nonconforming article 102 discussed above except that the machinable coating 206 is applied to build up a surface or area of the nonconforming article 202 such that the nonconforming article 202 has a desired geometry/size after being machined as described above. That is, the machinable coating 206 is first applied with a thickness/geometry that is greater than the desired thickness/geometry, and then machined down to the desired thickness/geometry as discussed above. The machinable coating 206 can have the same composition(s) as the machinable coating 106 discussed above.

The repairs discussed above enable a nonconforming article 102/202 that may otherwise be discarded to be salvaged.

As used herein, the term "about" has the typical meaning in the art, however in a particular example "about" can mean deviations of up to 10% of the values described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of repairing a nonconforming article, comprising:
    applying a machinable coating to an article with a nonconformance, the article including a preform at least partially infiltrated with a matrix material, to form a repaired article;
    machining the machinable coating;
    completing infiltration of the repaired article with the matrix material;
    wherein the nonconformance is that the article is smaller in a respect than a desired geometry of the article; and
    wherein the applying includes applying the machinable coating to a geometry that is larger than the desired geometry in the respect.

2. The method of claim 1, wherein the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

3. The method of claim 2, wherein the coating includes at least one of hafnon, zircon, and mullite.

4. The method of claim 1, wherein the nonconformance includes at least one of a dent, a depression, or a hole.

5. The method of claim 4, wherein the machinable coating fills in the nonconformance after the applying.

6. The method of claim 1, wherein the infiltration is by chemical vapor infiltration.

7. The method of claim 6, wherein the preform includes ceramic-based reinforcements and the matrix is a ceramic-based matrix.

8. The method of claim 1, wherein the machining includes at least one of grinding, ultrasonic machining, water guided laser, milling, and reaming.

9. The method of claim 1, wherein the machining includes machining the machinable coating to the desired geometry.

10. The method of claim 1, wherein the partially-infiltrated article is at least 75% infiltrated with the ceramic-based matrix material at the removing step.

11. A method of repairing an article, comprising:
placing a preform including ceramic-based reinforcements into a reactor;
flowing reactive gases through the reactor to infiltrate ceramic-based matrix material into the preform;
removing an at least partially-infiltrated article from the reactor, the at least partially-infiltrated article having a nonconformance;
applying a machinable coating for repairing the nonconformance;
replacing the at least partially-infiltrated article in the reactor;
flowing reactive gases through the reactor to complete infiltration of the ceramic-based matrix material into the at least partially-infiltrated article;
wherein the applying includes applying the machinable coating to an applied geometry that is larger than a desired geometry in the respect; and
further comprising machining the machinable coating to the desired geometry.

12. The method of claim 11, wherein the repairing is by applying a machinable coating.

13. The method of claim 12, wherein the nonconformance includes at least one of a dent, a depression, or a hole.

14. The method of claim 13, wherein the machinable coating fills in the nonconformance after the applying.

15. The method of claim 12, wherein the nonconformance is that the article is smaller in a respect than a desired geometry of the article.

16. The method of claim 11, wherein the partially-infiltrated article is at least 50% infiltrated with the ceramic-based matrix material at the removing step.

* * * * *